May 24, 1938.    R. H. WAGER    2,118,716
SMOKE INSPECTION DEVICE
Filed Sept. 30, 1935    6 Sheets-Sheet 1
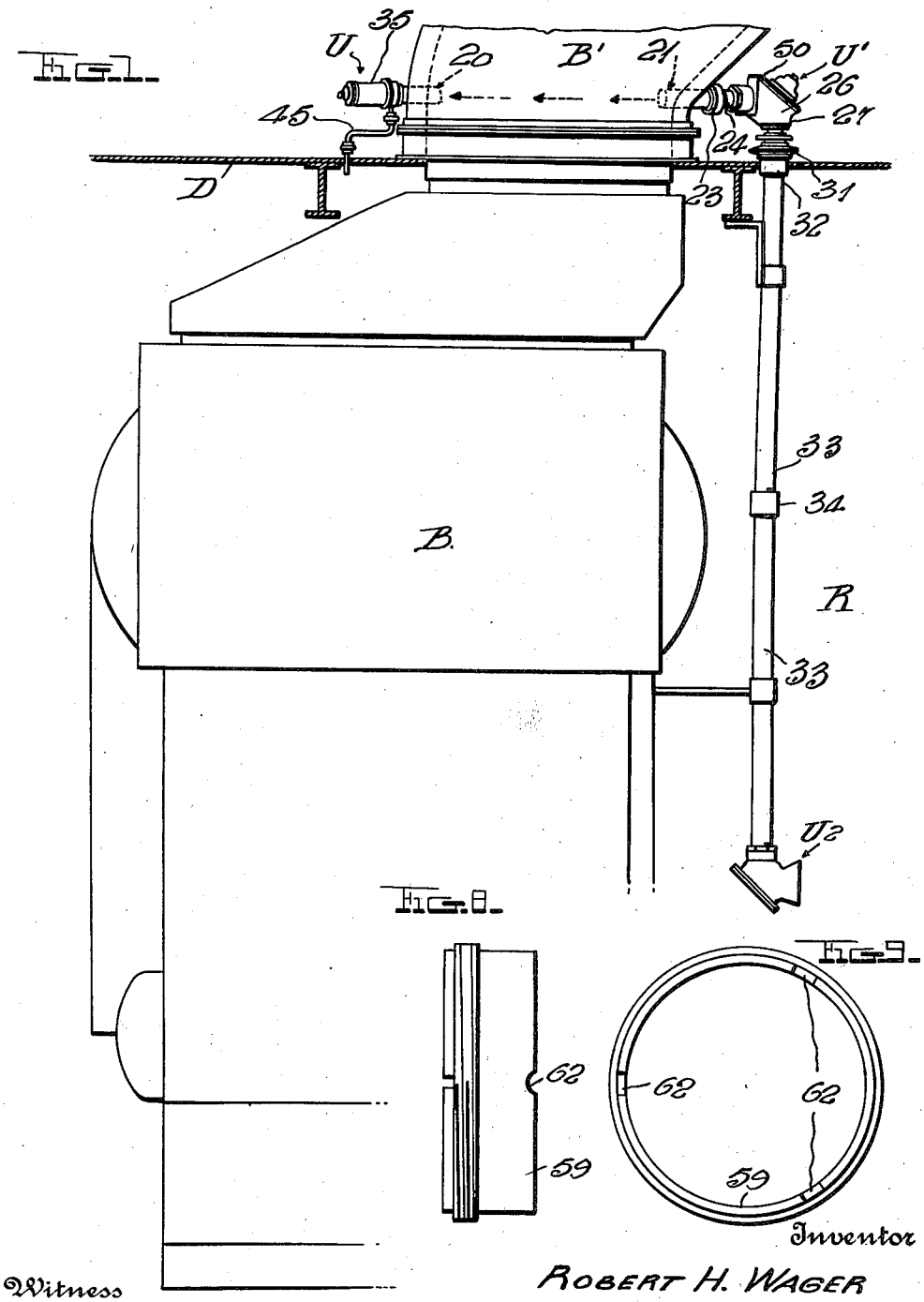
Inventor
ROBERT H. WAGER
By H. B. Williamson &co
Attorneys.

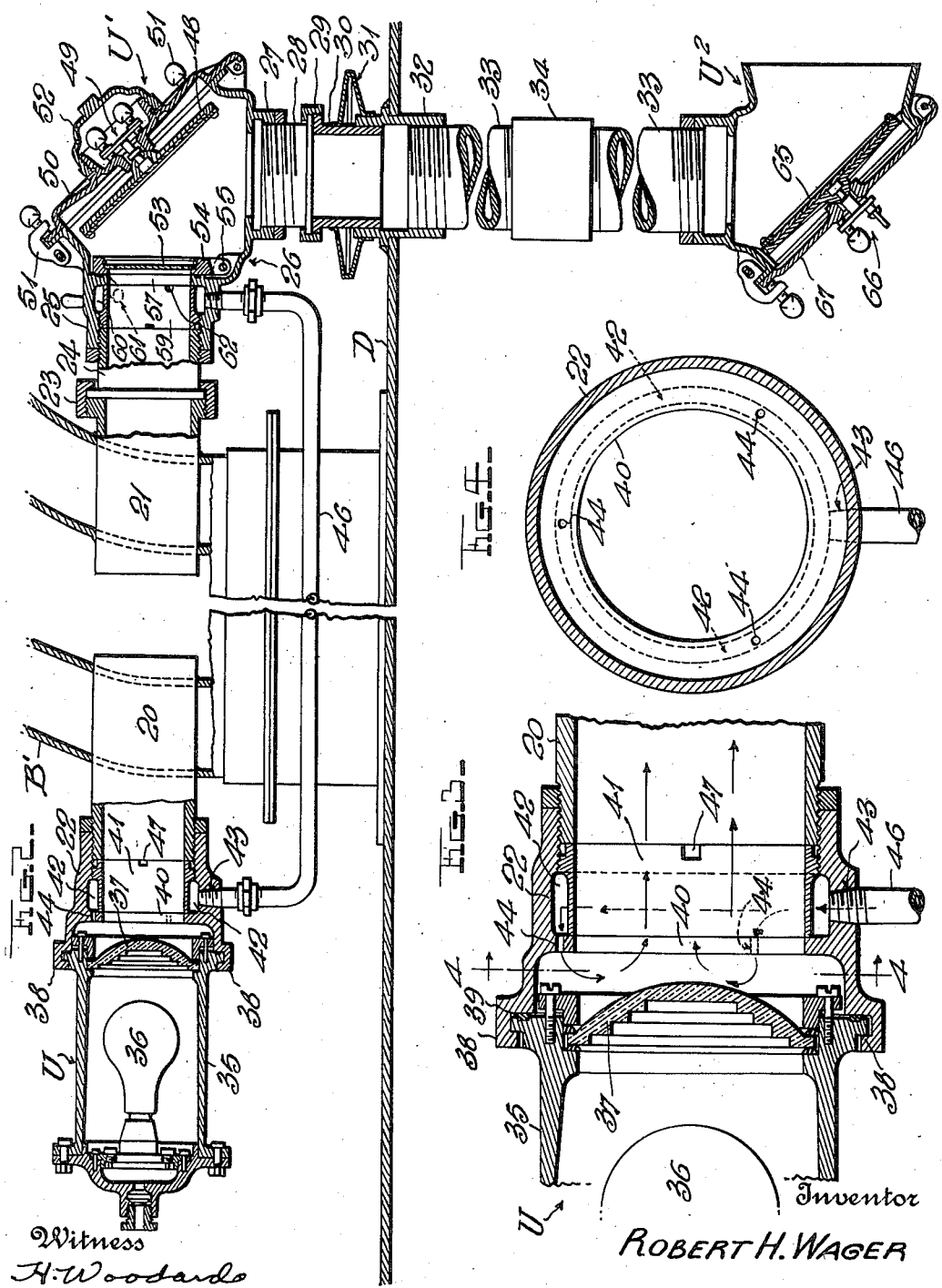

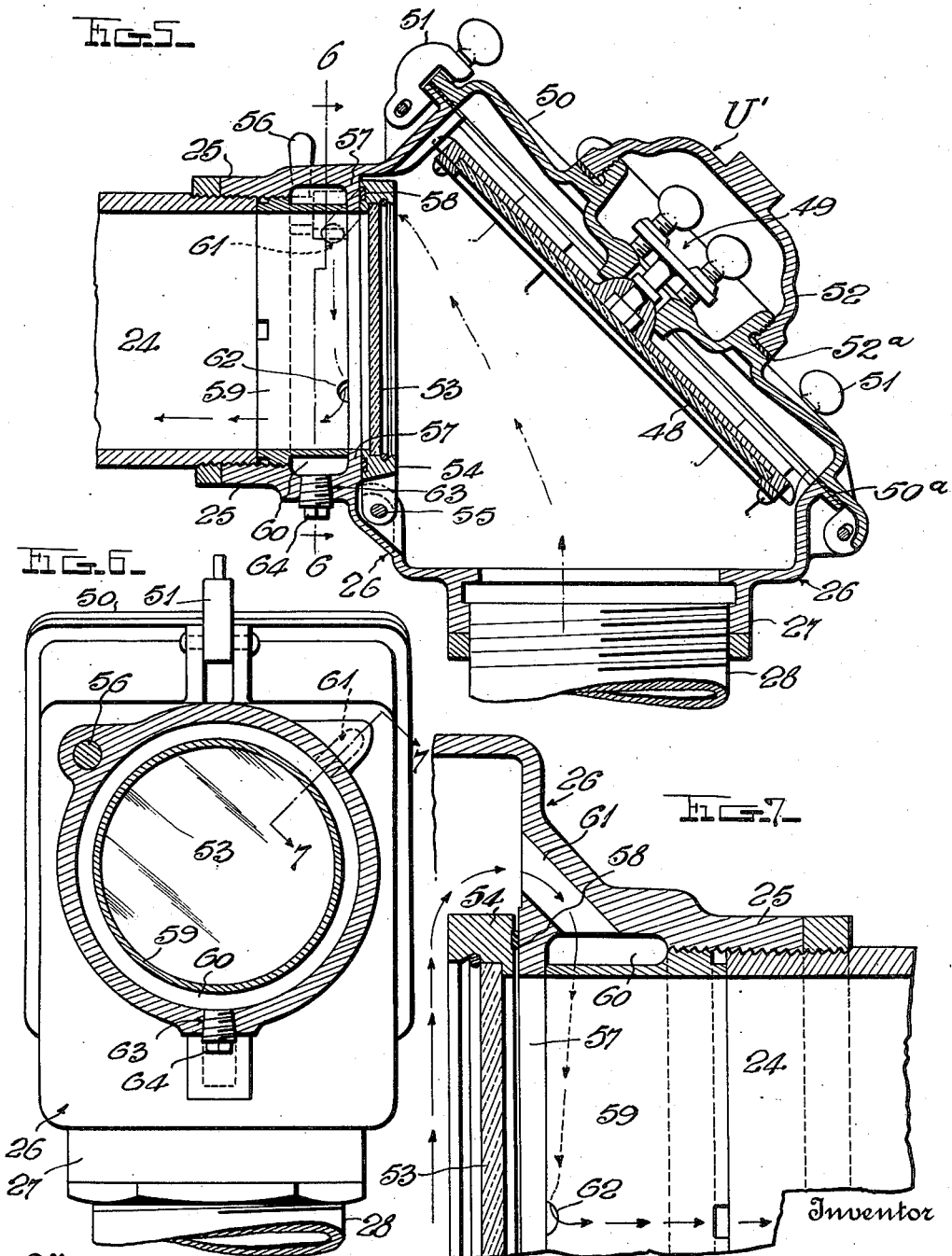

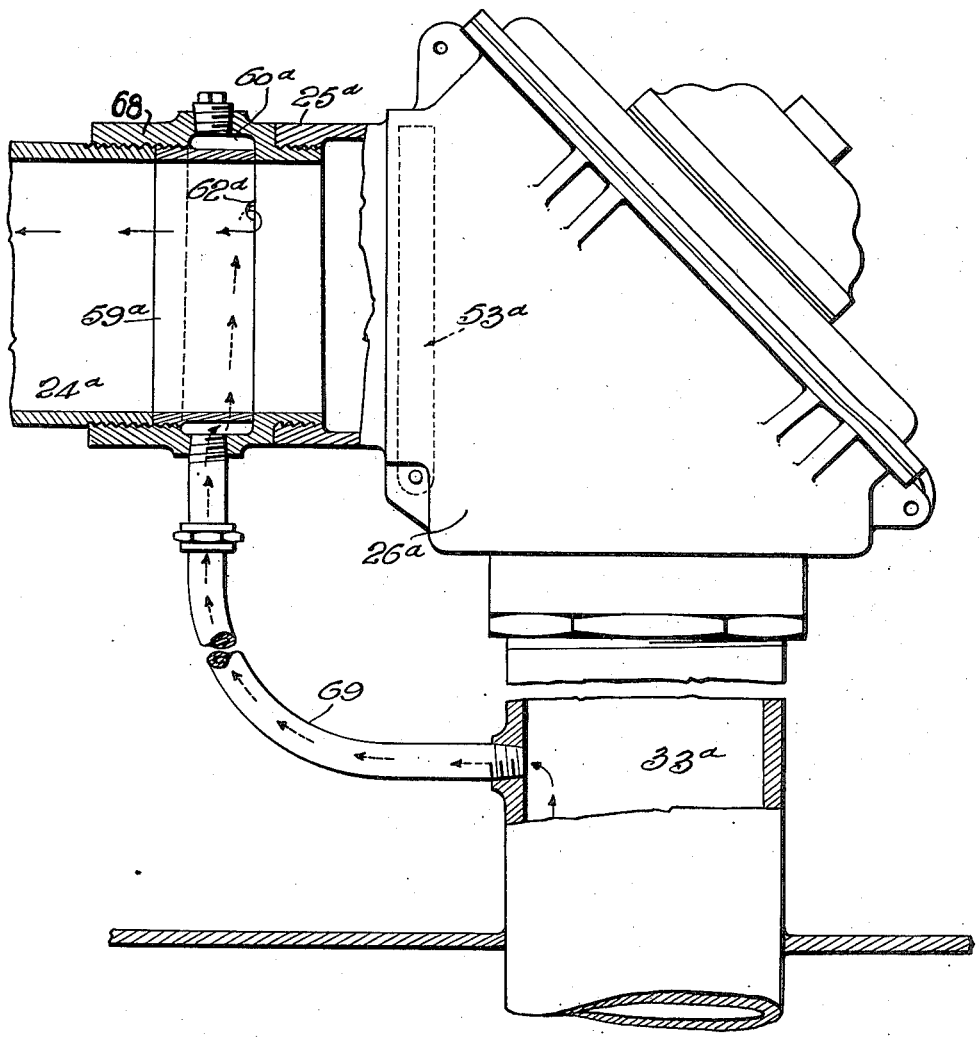

May 24, 1938.  R. H. WAGER  2,118,716
SMOKE INSPECTION DEVICE
Filed Sept. 30, 1935  6 Sheets-Sheet 5
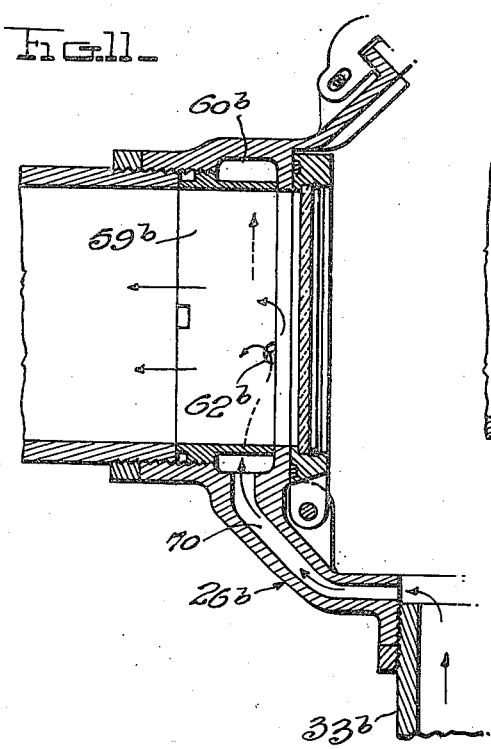
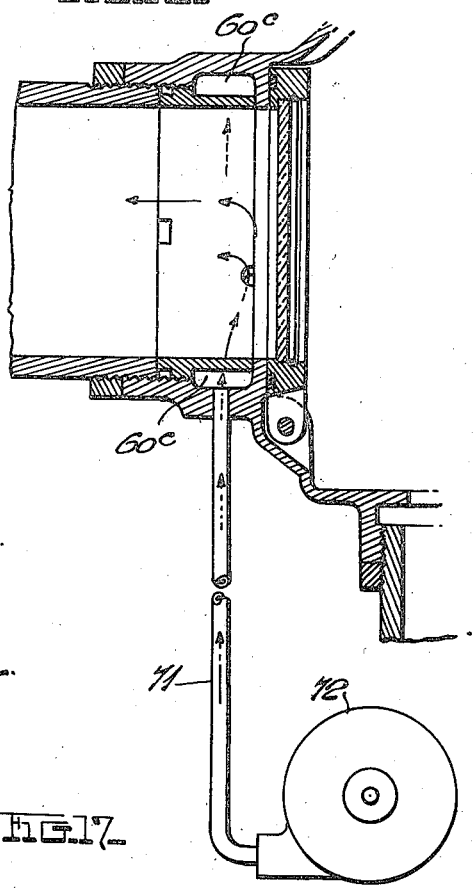
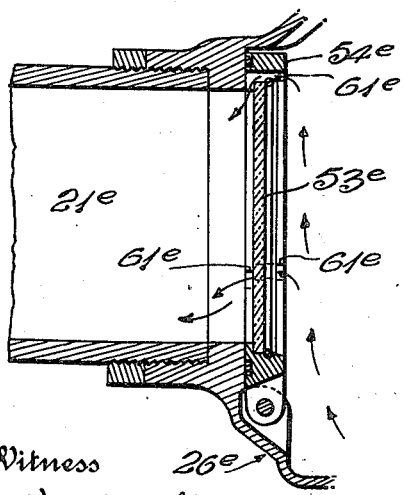
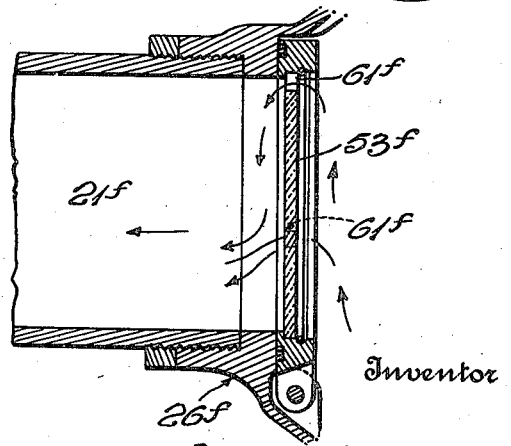
Witness
H. Wordach
Inventor
ROBERT H. WAGER
By H. B. Willson &co.
Attorneys.

May 24, 1938.  R. H. WAGER  2,118,716
SMOKE INSPECTION DEVICE
Filed Sept. 30, 1935   6 Sheets-Sheet 6
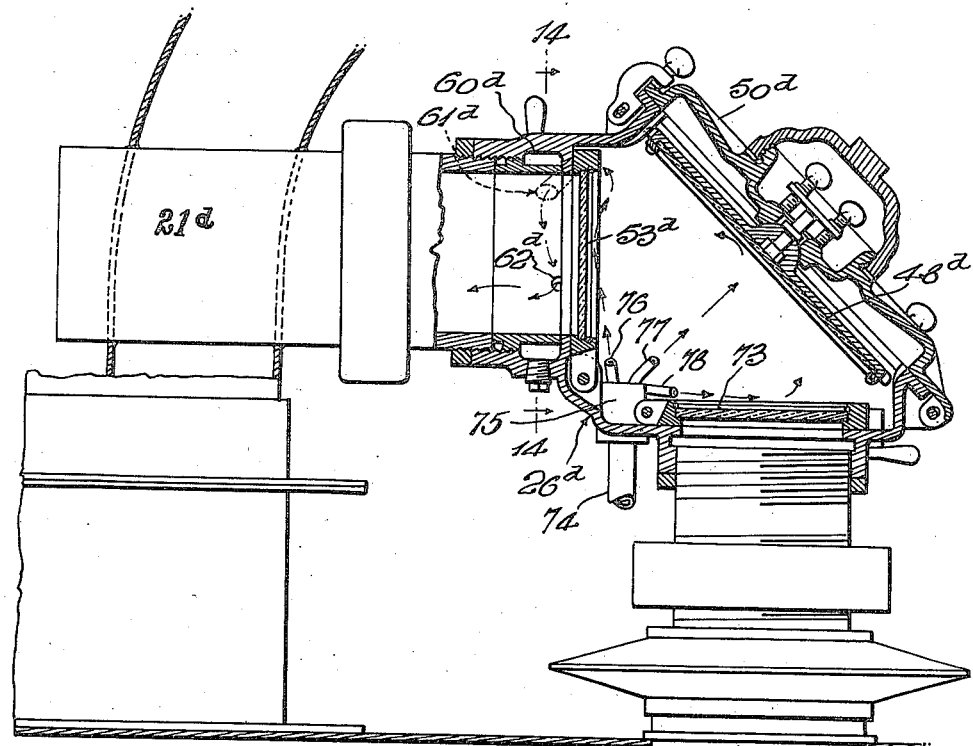
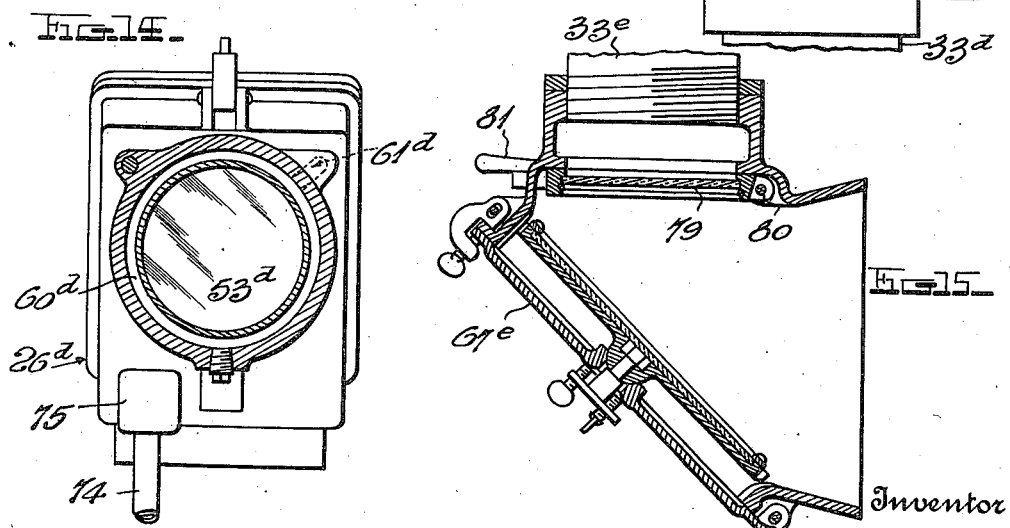
Inventor
ROBERT H. WAGER
Attorneys.

Patented May 24, 1938

2,118,716

UNITED STATES PATENT OFFICE 2,118,716

SMOKE INSPECTION DEVICE

Robert Hudson Wager, Maplewood, N. J.

Application September 30, 1935, Serial No. 42,919

11 Claims. (Cl. 88—14)

The invention relates to devices for visually inspecting the smoke discharged from boilers or the like, enabling the firemen to keep the air and fuel properly proportioned for best results and preventing the discharge of dense black smoke with its disadvantages and often penalties.

The device disclosed is of a type in which two horizontally alined passages communicate directly with the smoke uptake, breeching or the like, one of these passages being short and carrying a lamp and lens at its outer end while the other is relatively long, is of angular form, extends to a remote point, preferably in the boiler room, and is provided with reflecting mirrors and vision glasses, enabling the firemen or others to readily view the character of the smoke at any time.

The principal object of the invention is to make novel provision for using air under pressure to prevent smoke from flowing outwardly from the breeching or the like through the vision passages and depositing soot upon the various optical devices therein. In this connection, another object is to provide for using the usual above-atmospheric air pressure from the boiler room or the force feed blowers to prevent such soot accumulation.

A further object is to provide a smoke inspection device which may be connected above the main deck with the breechings of naval or other vessels, greatly facilitating installation, and a still further aim is to provide a device in which all parts above deck are thoroughly water-tight.

Most present-day boiler rooms are dust-free, due to the use of perfected stokers or oil burners, but provision is made whereby the invention may also be advantageously used even if dust should be prevalent in the boiler room, such dust being effectively prevented from interfering with clear vision.

With the foregoing in view, the invention resides in the novel subject matter hereinafter described and claimed, description being accomplished by reference to the accompanying drawings.

Fig. 1 discloses an elevation of a portion of a boiler and its breeching, illustrates the deck in section and discloses one form of the invention operatively connected with the breeching and extending into the boiler room.

Fig. 2 is an enlarged vertical sectional view partly in elevation showing the form of construction illustrated in Fig. 1.

Fig. 3 is an enlarged vertical sectional view showing the fitting which connects the lamp unit with the short vision tube.

Fig. 4 is a transverse sectional view on line 4—4 of Fig. 3.

Fig. 5 is an enlarged vertical sectional view through the reflecting unit which connects vertical and horizontal reaches of the relatively long, angular vision tube with each other.

Fig. 6 is a transverse sectional view on line 6—6 of Fig. 5.

Fig. 7 is a detail sectional view cut in the inclined plane indicated by line 7—7 of Fig. 6.

Fig. 8 is a side elevation of a ring embodied in the fitting shown at the right of Figs. 1 and 2 and in Fig. 5, said ring being instrumental in forming an annular air chamber in the fitting.

Fig. 9 is an edge view of the ring shown in Fig. 8.

Fig. 10 is a side elevation partly in section showing a different form of construction which may be embodied in the connection between the reflecting unit and the horizontal reach of the angular vision passage.

Figs. 11 and 12 are detail vertical sectional views similar to a portion of Fig. 5 but showing modifications.

Fig. 13 is a sectional view partly in elevation similar to the right hand portion of Fig. 2 but illustrating a construction which may be used when it is necessary to exclude dust from the reflecting unit.

Fig. 14 is a detail vertical sectional view on line 14—14 of Fig. 13.

Fig. 15 is a sectional view through the observation unit showing a dust excluding panel which may be used therein.

Figs. 16 and 17 are fragmentary sectional views through the connected portions of the reflecting unit and the horizontal reach of the angular vision passage, showing two further modifications.

The construction shown in Figs. 1 to 9 will first be described.

A boiler B is shown immediately below a deck D, said boiler being within the usual boiler room R and having an uptake or breeching B' passing through the deck and extending as usual to the smoke stack.

Two short pipes 20 and 21 are welded in openings in opposite sides of the uptake or breeching B', said pipes being in alinement with each other. The outer end of the pipe 20 is connected by a fitting 22 with a lamp unit U. The outer end of the pipe 21 is connected by a union 23 and a short nipple 24 with the horizontal end 25 of a right-angular fitting or elbow 26 forming part of a reflecting unit U¹. The vertical end 27 of the elbow 26 is connected with a short nipple 28 which is in turn connected at 29 with another short nipple 30, this nipple 30 being connected by a suitable expansion joint 31 with a collar 32 which is welded in an opening in the deck D. A vertical pipe which may well consist of sections 33 coupled at 34, is connected at its upper end with the collar 32, the lower end of said pipe being connected with a right-angular observation unit U².

The lamp unit U includes a water-tight casing 35 containing an electric lamp bulb 36, the inner end of said casing 35 being fluid-tightly closed by a lens 37. By means of a bayonet slot connecting means or the like 38 and a gasket 39, the casing 35 is detachably connected with the outer end of the fitting 22. In a plane spaced from the lens 37, this fitting is provided with an annular internal rib 40, and a ring 41 which is threaded into the fitting 22, abuts this rib, said ring and fitting having portions spaced apart radially to provide an annular air chamber 42. At a suitable point, this chamber is provided with an air inlet opening 43, and circumferentially spaced openings 44 extend through the rib 40, to form outlets from said chamber. Air enters the chamber 42 under pressure, escapes through the openings 44 and flows through the pipe 20 into the uptake or breeching B', thus preventing smoke from flowing outwardly through said pipe 20 and reaching the lens 37. The severe smoking of the lens which would otherwise take place, is thus prevented, and whenever said lens should require cleaning, even though practically all of the smoke is excluded from it, the casing 35 may be readily detached to give access to said lens.

In Fig. 1, a supply pipe 45 for air under pressure, extends through the deck D, one end of said pipe being in communication with the fire room R, while the other end thereof is connected with the air inlet 43 of the annular air chamber 42. The air pressure at times within the fire room R is considerably in excess of atmospheric pressure and in excess of the pressure in the breeching at the end of the pipe 20. Therefore, air under pressure from the fire room will flow through the pipe 45 into the air chamber 42 and will discharge from this chamber through the openings 44 into the fitting 22 and pipe 20 to keep smoke away from the lens 37, as previously explained.

In Fig. 2, instead of making use of the pipe 45, I have shown another pipe 46 extending around the breeching B' for conducting air under pressure into the chamber 42. The manner in which the air under pressure is received by the pipe 46 will be later described.

47 in Figs. 2 and 3 is merely one of a plurality of notches in the outer edge of the ring 41 to facilitate threading of this ring into the fitting 22.

The reflecting unit U¹ includes a mirror 48 adjustably mounted by suitable means 49 upon a hinged cover 50 with which the elbow 26 is provided, said cover 50 being held closed in a water-tight manner by appropriate clamps 51. I preferably use a gasket 50ª between the elbow and the cover to insure a water-tight and air-tight seal. A water-tight cap 52 water-tightly connected with the cover 50, normally covers the adjusting means 49 for the mirror 48 but may be removed to gain access to said adjusting means when initially adjusting the mirror to the proper position. A gasket 52ª is preferably arranged beneath the cap 52 which may have a screw threaded engagement with the cover 50, as seen in Fig. 5.

A transparent vision glass or panel 53 is mounted at the inner end of the horizontal end 25 of the elbow 26, being carried by a suitable frame 54 which is hinged at 55 and may be held normally in the position shown in Figs. 2 and 5 by a suitable latch, a portion of which is seen at 56 in Fig. 5. When in this normal position, the frame 55 lies against an annular rib 57 formed in the horizontal end portion 25 of the elbow 26, and a suitable gasket 58 is preferably carried by said frame to tightly engage said rib. A ring 59 similar to the ring 41 is threaded into the elbow end 25 and abuts the rib 57, said elbow end and ring having portions spaced apart to provide an annular air chamber 60. An air inlet passage 61 leads to this chamber 60 from the interior of the elbow 26, said passage being located at the periphery of the frame 54 as shown most clearly in Figs. 6 and 7. Spaced notches 62 are formed in the inner edge of the ring 59 constituting air outlets from the chamber 60 into the pipe 21. Air under pressure from the furnace room R flows through the piping 33 into the elbow 26, from this elbow through the passage 61 into the chamber 60, and from this chamber through the notches 62 into the pipe 21, and on to the breeching B'. In flowing in this manner, the air under pressure prevents smoke from passing outwardly through the pipe 21 and reaching the glass 53. Should it be necessary to clean this glass from time to time, regardless of the exclusion of smoke therefrom, this may be done by outwardly swinging the cover 50 and swinging the frame 54 into the interior of the elbow 26.

Any dust or soot which may possibly accumulate in the chamber 60 may be removed through an opening 63 in the bottom thereof. This opening may be plugged as at 64 (Fig. 5), if it be used only for clean-out purposes. In Fig. 2, however, the pipe 46 which supplies air to the chamber 42, connects with the opening 63 and receives its air from the chamber 60. When air is supplied to the chamber 42 by the pipe 45 (Fig. 1), opening 63 will be closed by the plug 64.

The observation unit U² is preferably of the form shown, being provided with a mirror 65 adjustably mounted by suitable means 66 upon an outwardly swingable cover 67.

By looking into the observation unit U², the lens 37 and the smoke can be seen, and the firemen can regulate the proportion of fuel and air until the smoke shows that the most perfect combustion is taking place. The above-atmospheric pressure from the fire room or boiler room R is effectively utilized to prevent smoke from flowing outwardly through the pipes 20 and 21 and discoloring the lens 37 and the transparent plate 53. The device is connected with the breeching above the deck and installation is thus greatly facilitated. Due to the water-tight construction employed however, there is no danger of any water entering the smoke inspection device or entering the fire room through said device. All parts which should be kept absolutely clean, are readily accessible and may be cleaned quickly and easily. The air need not necessarily be supplied to the chambers 42 and 60, in the ways so far disclosed, as will become obvious as the description proceeds.

In Fig. 10, the elbow 26ª corresponds to the elbow 26, and its vertical end is connected with piping 33ª corresponding to the piping 33. The horizontal end 25ª of the elbow 26ª is provided with an extension 68 in which an annular air chamber 60ª is formed, corresponding to the chamber 60, said chamber being formed with the aid of a ring 59ª. Air may be fed to the chamber 60ª by any suitable means. For illustrative purposes, a pipe 69 is shown connected at one end with said chamber and at its other end with a pipe 33ª. Air is discharged into the pipe 24ª which corresponds with the pipe 24, through notches 62ª formed in the inner edge of the ring 59ª, so that smoke is prevented from flowing outwardly and reaching the panel 53ª which corresponds to panel 53.

In Fig. 11, the elbow 26ᵇ corresponds to the elbow 26 and said elbow is provided with an air chamber 60ᵇ formed in part by a ring 59ᵇ and provided with air discharge openings 62ᵇ. An air inlet passage 70 is formed in a portion of the elbow 26 to conduct air under pressure to the chamber 60ᵇ from the piping 33ᵇ leading from the fire room. When this construction is used, no passage such as 61 (Fig. 7) is necessary but if one should be provided, it may be plugged.

In Fig. 12, the construction is very similar to that shown in Fig. 11 but instead of using the passage 70 to conduct air to the chamber 60ᶜ, a pipe 71 is shown leading from a blower 72. The air may be pre-heated if desired to prevent sweating of any of the optical devices with which it comes in contact.

In Fig. 13, the elbow 26ᵈ is provided with a transparent hingedly mounted panel 53ᵈ, with an annular air chamber 60ᵈ, with an air inlet passage 61ᵈ for said chamber, and with air outlets 62ᵈ from said chamber. Another transparent panel 73 is mounted in the elbow to prevent any dust which may exist in the fire room from entering said elbow from the piping 33ᵈ. Either one of the panels 53ᵈ or 73 may be swung into the elbow for cleaning when the cover 50ᵈ is opened. Air under pressure from the furnace room or from a blower is supplied through a pipe 74 which connects with a hollow boss 75 on the exterior of the elbow 26ᵈ. Three small air-conducting tubes 76, 77, and 78 are mounted within the elbow with one end in communication with the boss 75, the other ends of said tubes being open. These tubes are positioned to discharge air against the transparent panels 53ᵈ and 73 and the mirror 48ᵈ, respectively, and the air discharged into the elbow from said tubes, passes through the passage 61ᵈ into the annular chamber 60ᵈ and discharges from this chamber through the outlets 62ᵈ flowing on into the breeching through the piping 21ᵈ. The air is supplied at such temperature as to prevent the inner sides of the panels 53ᵈ and 73, and the mirror 48ᵈ from sweating, and this same air prevents smoke from reaching the panel 53ᵈ.

If desired, instead of using a dust excluding panel such as 73, above described, a similar panel 79 may be mounted in the observation unit as seen in Fig. 15, excluding dust from the piping 33ᵉ which corresponds to the piping 33ᵈ. The panel 79 is preferably hinged at 80 and held normally horizontal by a suitable latch 81, and when the cover 67ᵉ of the observation unit is opened, said panel may be swung downwardly for cleaning.

In Fig. 16, the frame 54ᵉ within the elbow 26ᵉ is provided with air passages 61ᵉ for conducting the air under pressure from the interior of said elbow to the piping 21ᵉ which communicates with the breech of the boiler or the like.

In Fig. 17, the transparent panel 53ᶠ is itself formed with air passages 61ᶠ for conducting air under pressure from the interior of the elbow 26ᶠ into the piping 21ᶠ which communicates with the breeching or the like. In both Figs. 16 and 17, the admission of air under pressure to the piping which communicates with the breeching or the like, prevents any smoke from flowing outwardly and reaching the transparent vision glass or panel.

It will be seen from the foregoing that novel and advantageous provision has been made for attaining the objects of the invention. While preferred features of construction have been shown, variations may of course be made within the scope of the invention as claimed.

I claim:

1. In combination, a boiler room, a boiler in said boiler room having a smoke outlet passage, a vision passage having a horizontal portion communicating with a portion of said smoke passage containing pressure less than the boiler room air pressure, a transparent member across said horizontal portion of said vision passage, the lower end of said vision passage being open to the boiler room to receive air under pressure therefrom, and means for bypassing the received air from a portion of said vision passage around said transparent member and into the portion of said vision passage between said transparent member and said smoke passage, thereby preventing smoke from flowing outwardly through said horizontal portion of said vision passage and reaching said transparent member.

2. In combination, a boiler room, a boiler in said boiler room having a smoke outlet passage, a vision passage having a horizontal portion communicating with a portion of said smoke passage containing pressure less than the boiler room air pressure, a transparent member across said horizontal portion of said vision passage, the lower end of said vision passage being open to the boiler room to receive air under pressure therefrom, said vision passage being provided in its horizontal portion with an annular air chamber, with air outlets from said air chamber into said horizontal portion between said transparent member and said smoke passage, and with an air-conducting passage leading to said air chamber from a portion of the vision passage which is open to the boiler room; a second vision passage communicating with said smoke passage in alinement with said horizontal portion of the first named vision passage, a lamp unit mounted at the outer end of said second vision passage, said second vision passage being provided with an annular air chamber and with air outlets from this chamber into its interior, and an air-conducting pipe leading from the air chamber of the first named vision passage to said air chamber of said second vision passage.

3. In a smoke inspection device, a vision passage and a light passage mounted in alinement with each other and both communicating with a smoke passage, each of said passages having an annular air chamber between its inner and outer peripheries and each having air outlets from said air chamber into its interior, and an air-conducting pipe placing the two air chambers in communication with each other, one of said chambers having an inlet for air under pressure, whereby the air discharged into said passages will prevent outflow of smoke therethrough.

4. In a smoke inspection device, a tubular vision passage including a pipe communicating at one end with a smoke passage, and a fitting element to which the other end of said pipe is secured; a ring element secured in said fitting element, said elements having portions spaced apart to provide an air chamber, one of said elements being provided with an inlet for admitting air under pressure to said air chamber, one of said elements being provided with spaced air outlets leading from said chamber and positioned to supply air under pressure to said pipe for the purpose of preventing outflow of smoke through said pipe.

5. In a smoke inspection device, an elbow containing a reflector and adapted to receive air under pressure, said elbow having vertical and horizontal end portions for connection with vertical and horizontal vision pipes respectively, a transparent member mounted across said horizontal end portion, said horizontal end portion being provided with an air chamber between its inner and outer peripheries, said elbow having a passage positioned to conduct air under pressure from the interior of the elbow into said air chamber, said horizontal end portion being provided with spaced air passages leading from said air chamber through the inner periphery of said horizontal end portion to conduct air under pressure into the horizontal pipe, preventing smoke from flowing outwardly therethrough and reaching said transparent member.

6. In a smoke inspection device, an elbow having vertical and horizontal end portions for connection with vertical and horizontal vision pipes respectively, said elbow being provided with a reflecting mirror between said end portions and with transparent barriers at the inner ends of said end portions, air-conducting means communicating with said elbow and having portions arranged to direct air against said mirror and the inner sides of both of said panels, said elbow being provided with air discharge means from the interior of its major portion into the interior of its horizontal end portion.

7. In a smoke inspection device, a vision passage and a light passage mounted in alinement with each other and both communicating with a smoke conductor, each of said passages having an annular air chamber between its inner and outer peripheries and each having air outlets from said chamber into its interior, and an air-conducting pipe placing the two air chambers in communication with each other, one of said chambers having an inlet for air under pressure.

8. In combination, a boiler room, a boiler in said room having a smoke outlet, a vision passage communicating with a portion of said smoke outlet containing pressure less than the boiler room air pressure, a mirror in said vision passage, a transparent member across said vision passage between said mirror and said smoke outlet, a portion of said vision passage below said mirror being in communication with said boiler room to receive air under pressure therefrom, and means for by-passing the received air around said transparent member and into the portion of said vision passage between said transparent member and said smoke outlet.

9. In combination, a boiler room, a boiler in said boiler room having a smoke outlet, a vision passage communicating with a portion of said smoke outlet containing pressure less than the boiler room air pressure, a transparent member across said vision passage, a portion of said vision passage being in communication with said boiler room to receive air under pressure therefrom, said vision passage being provided near said transparent member with an annular air chamber, with an air inlet passage for said air chamber leading from a portion of said vision passage which receives air under pressure from said boiler room, and with air outlets from said air chamber, said outlets opening into said vision passage between said transparent member and said smoke outlet; a second vision passage communicating with said smoke outlet opposite the first mentioned vision passage, a lamp unit mounted in the outer end of said second vision passage, this second passage being provided with an annular air chamber and with air outlets from this chamber into its interior, and an air-conducting pipe leading from the air chamber of the first mentioned vision tube to the air chamber of said second vision tube.

10. In combination, a boiler room, a boiler in said boiler room having a smoke outlet, a vision passage communicating with a portion of said smoke outlet containing pressure less than the boiler room air pressure, and a transparent member across said vision passage, a portion of said vision passage being in communication with said boiler room to receive air under pressure therefrom, said vision passage being provided near said transparent member with an annular air chamber, with an air inlet passage for said air chamber leading from a portion of said vision passage which receives air under pressure from said boiler room, and with air outlets from said air chamber; said outlets opening into said vision passage between said transparent member and said smoke outlet.

11. In a smoke inspection device, a coupling sleeve having an internal circumferential groove between its ends, said sleeve being internally threaded from one of its ends toward one side of said groove and having a circumferential internal rib at the opposite side of said groove, the other end of said sleeve being provided with means for securing a lens thereto, and a tubular ring having threaded engagement with the threads of said sleeve, one edge of said tubular ring being spaced inwardly from said one end of said sleeve to allow threading of a pipe into the latter, said tubular ring spanning said groove and having its other edge abutting said circumferential rib to coact with said groove in forming an annular air chamber, said rib having circumferentially spaced openings forming air outlets for said annular air chamber, and an air inlet for said chamber.

ROBERT HUDSON WAGER.